Figure 1:
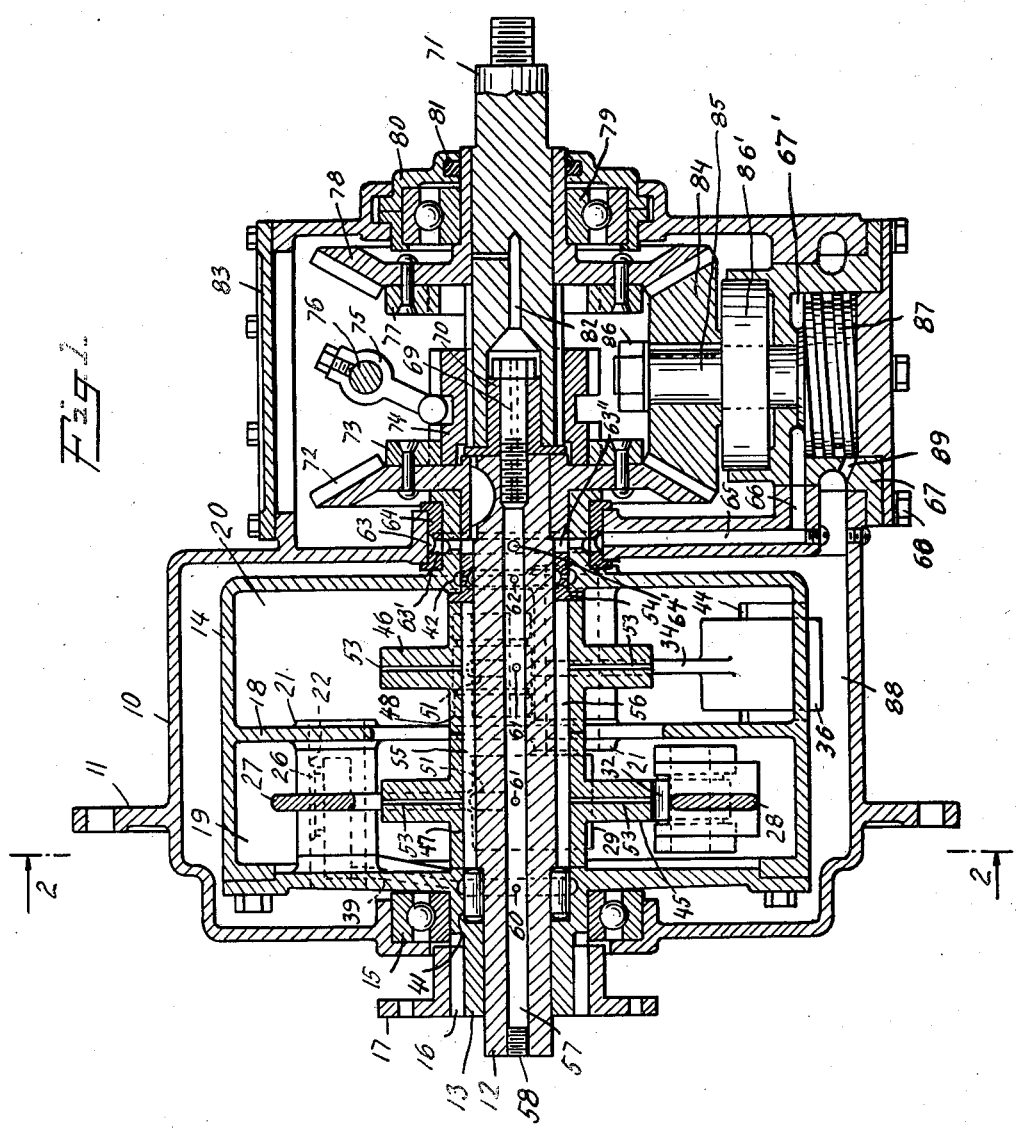

May 20, 1930.  F. R. PORTER  1,759,466
AUTOMATIC SPEED CHANGE MECHANISM
Filed Aug. 21, 1929  2 Sheets-Sheet 1

INVENTOR
Finley R. Porter
BY
Pennie, Davis, Marvin & Edmonds
ATTORNEYS

May 20, 1930.   F. R. PORTER   1,759,466
AUTOMATIC SPEED CHANGE MECHANISM
Filed Aug. 21, 1929   2 Sheets-Sheet 2

INVENTOR
Finley R. Porter
BY
Pennie, Davis, Marvin & Edmonds
ATTORNEYS

Patented May 20, 1930

1,759,466

UNITED STATES PATENT OFFICE

FINLEY R. PORTER, OF PORT JEFFERSON, NEW YORK, ASSIGNOR TO JOHN DALE, TRUSTEE

AUTOMATIC SPEED-CHANGE MECHANISM

Application filed August 21, 1929. Serial No. 387,338.

This invention relates to automatic speed change mechanism and has particular reference to mechanism which automatically changes the speed between a driving member and a driven member in accordance with the load to which the driven member is subjected and the torque and speed developed by the driving member.

The principal object of this invention is to provide a mechanism of the type described which is particularly adapted for automatically regulating the ratio of the speed of an engine or motor to that of an automobile or other vehicle, boat, or the like driven thereby, and when so employed, the mechanism functions in response to throttle control to automatically regulate the driving torque in accordance therewith so as to accommodate or compensate for the resistance torque, whether the latter is road, water, air or other resistance.

Another object of this invention is to provide a mechanism of the type described which transmits all of the motive power at all speeds to the driven member without requiring the intervention of the human element at any time beyond the regulation of the motive power.

A further object of the invention is to provide a mechanism of the type described which is in the form of a compact unit having few moving parts which are self lubricating and whose operation is rendered smooth and shockless by the provision of hydraulic throttling means, the aforesaid compact unit comprising the new mechanism being adapted for immediate insertion in existing automobile or like constructions in substitution of the usual transmission unit.

These and other objects are obtained in a preferred embodiment of the invention particularly adapted for vehicle, marine or other types of engines, and which comprises a member driven directly by the engine carrying a plurality of sets of centrifugally operated, weighted rocker arms whose turning moment, which is variable in accordance with the engine speed, is applied as pressure by means of rollers upon separate, corresponding, variable throw cams mounted upon the driven shaft. These cams are permitted a limited reverse rotational movement relatively to the driven shaft upon which they are mounted, this limited relative movement being controlled hydraulically by a throttling action produced by a continuous oil supply, which also serves to lubricate the moving and bearing parts of the mechanism.

When the mechanism described is driven by the engine, the centrifugal force developed in the rocker arms will cause their rollers to follow the respective cams, whereby a pendulous action is imparted to the former. When, at any given point on these cams, this pressure upon the cams is equal to or greater than the driven shaft resistance, the rocker rollers will come to rest on their respective cams and the latter together with the driven shaft are driven at unit-speed. The aforementioned hydraulic cushion because of its throttling action prevents the shock of sudden force application to the driven shaft and renders the operation of the mechanism smooth and also provides for lost motion whereby no reverse turning moment is set up when the vehicle is braked, for example.

In this way the full driving torque is transmitted to the driving shaft, the rocker arms remaining at rest at their assumed position on the cams when the engine speed as controlled by the throttle remains constant.

Figure 2:
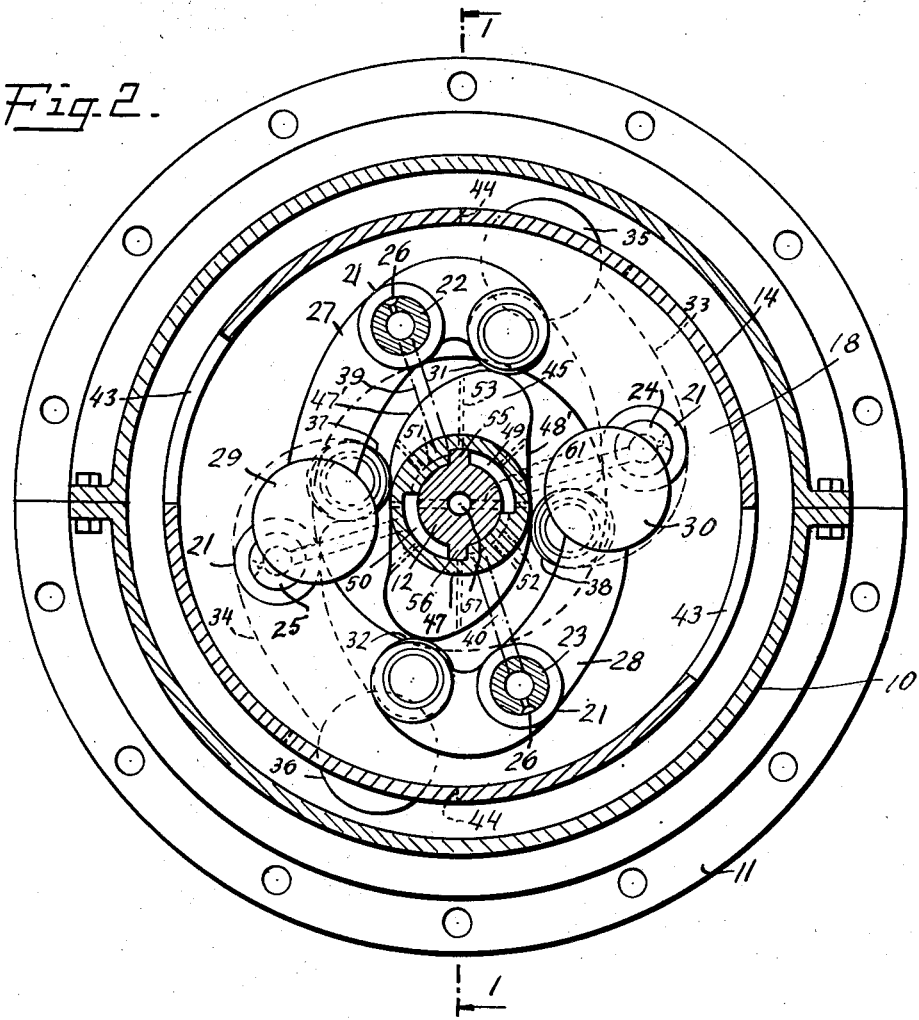

For a better understanding of this invention, reference is made to the accompanying drawings, in which Figure 1 is an axial section of the new mechanism of this invention as seen along the line 1—1 of Fig. 2; and Fig. 2 is a transverse section of the same as seen along the line 2—2 of Fig. 1.

In these drawings, numeral 10 designates the stationary casing of the automatic speed changing mechanism of this invention, this housing being secured by its lateral flange 11 to the bell housing normally enclosing the fly wheel and clutch of an automobile engine, for example. The casing 10 occupies the position of the usual transmission gear box of the present type of automobile and is adapted to be substituted therefor without other changes in the automobile.

Piloted in the end of the crank shaft, not shown, is the driven shaft 12 upon which is journalled the sleeve 13 of the rotatable drum 14, this sleeve 13 in turn being journalled in a ball or other anti-friction bearing 15 secured to the stationary casing 10. The drum 14 is driven by the automobile engine by means of a gear clutch 16, one element of which is secured by its flange 17 to the face of the fly wheel, and the other element of which is formed on the outer surface of sleeve 13. The provision of this gear clutch 17 enables the ready mounting and dismounting of the mechanism without disturbing the fly wheel, since the clutch 16 may be readily connected when the end of the driven shaft 12 is inserted in its crank shaft pilot. The gear clutch 16 also permits accurate centering of the mechanism without requiring especial machining operations since the teeth of the clutch 16 permit a limited radial leeway.

The drum 14 is provided with a radial partition 18, which divides the interior thereof into two chambers, 19 and 20. This partition 18 is fitted with four bearing bosses 21 located ninety degrees apart. Journalled in one pair of diametrically opposite bearing bosses 21 and in the front wall of drum 14 are a pair of hollow fulcrum pins 22 and 23, these pins being provided with radial oil holes and surface grooves 26. Mounted upon the pins 22 and 23 are rocker arms 27 and 28, respectively. These rocker arms 27 and 28 are in the form of simple curved levers, and at the extremity of the long arms thereof are mounted the respective weights 29 and 30. At the extremity of the short arms of rocker arms 27 and 28 are mounted the follower rollers 31 and 32, respectively. Similarly mounted upon fulcrum pins 24 and 25 journalled in the other pair of diametrically opposite bosses 21 and in the rear wall of drum 14 are the rocker arms 33 and 34, equipped with the respective weights 35 and 36 and with the respective follower rollers 37 and 38, as shown in Figs. 1 and 2.

The interior of hollow pin 22 of rocker arm 27 is supplied with oil through oil passage 39, drilled through the front wall of the drum 14 and communicating with the overrunning clutch 41 located in the inner face of the sleeve 13, this clutch being described later herein. Pin 23 of rocker arm 28 is supplied with oil by passage 40 in the same way and the pivot pins of rocker arms 33 and 34 are similarly lubricated by an oil passage drilled through the rear wall of drum 14, not shown, but communicating with the annular oil groove 42. The oil supplied to these pivot pins creeps along them and through the radial passages 26 to lubricate the bearings of the rocker arms.

In order to accommodate the outward radial movement of the weights 29 and 30, apertures 43 are formed in the outer wall of the drum 14, and similar apertures 44 are also formed therein in order to accommodate the outward radial movement of the second set of weights 35 and 36. This outward radial movement of the rocker arm weights 29, 30, 35, and 36 accompanies the rotation of the drum 14 when the engine is coupled thereto through the gear clutch 16 described above, this outward radial movement of these weights being due to centrifugal force. This movement of the weights causes the rocker arms to move about their stationary pivots and causes the rollers 31 and 32 of respective rocker arms 27 and 28 to follow the surface of variable motion disc cam 45, and, similarly, the outward movement of weights 35 and 36 causes corresponding rocker arms 33 and 34 to move about their pivots so that the rollers 37 and 38 follow the surface of the second disc cam 46.

Cams 45 and 46 are variable motion cams whose positive or working surfaces 47' are combination uniform motion and constant acceleration curves and extend to the peak of the cams while the reverse sides 48' of these cams are negative or deceleration curves merging into a straight side, which is tangent to the small diameter of the cams 45 and 46. The cams 45 and 46 are double cams, one side of each at a time cooperating with the corresponding diametrically opposite rocker arms, such as arms 27 and 28 shown in Fig. 2 of the drawings. In order to produce uniform torque, these cams 45 and 46 are designed to have a working range of 120 degrees every half revolution or 240 degrees per revolution. Also, as shown in Figs. 1 and 2, cam 46 is placed in exact alignment with respect to cam 45, but the rocker arms 33 and 34, cooperating with the second cam 46, are placed 90 degrees from the first pair of rocker arms 27 and 28. This arrangement provides a constant moment, since when cam 45 is on the negative or deceleration stroke, represented by the deceleration side 48' of cam 45, rocker arms 33 and 34 are on the working stroke.

As shown particularly in Fig. 2, the hubs 47 and 48 of cams 45 and 46, respectively, are broached axially to form two diametrically opposite grooves 49 and 50, these grooves having a width slightly exceeding ninety degrees. Connecting these grooves are the curved oil slots 51 and 52. Oil holes 53 connect the surfaces of the disc cams 45 and 46 with the oil slots 49 and 50 and oil grooves 51 and 52, whereby the surfaces of these cams are lubricated from within. As seen in Fig. 1, the hubs 47 and 48 of cams 45 and 46, respectively, occupy the space between the hub of sleeve 13 and the bushing 54 of bearing metal interposed between the front hub of drum 14 and the front end of the hub 48 of cam 46.

The shaft 12 is provided with a pair of diametrically opposite key-like abutments 55 and 56 which are disposed in the annular grooves 49 and 50, respectively, of the hubs 47 and 48 of respective cams 45 and 46. The shaft 12 is drilled axially at 57, and the opening of this drill at the pilot end of shaft 12 is sealed by a plug 58. Interposed between the sleeve 13 and the shaft 12 is an overrunning clutch 41, which is adapted to connect the mechanism to the engine in the event that the velocity of the vehicle exceeds the speed of the engine such as when the vehicle is rolling down hill, or in other instances when the car speed exceeds that of the engine, and permits cranking of the engine while coasting. This clutch also compensates for any hunting tendency of the mechanism when load conditions change within narrow limits. This overrunning clutch is supplied with lubricant from the oil hole 57 of shaft 12 by a drilled passage 60, and the chamber thereof supplies oil to passage 39 and rocker arm fulcrum pin 22 as described above.

Similarly, oil grooves 49 and 50 and oil slots 51 and 52 in the hubs 47 and 48 of cams 45 and 46, respectively, are connected with the oil hole 57 of shaft 12 by means of drilled passageways 61. A similar drilled passage supplies oil from the oil hole 57 of shaft 12 to annular oil groove 42 in the front bearing of drum 14, this passage being designated 62. Oil under pressure is supplied to axial oil hole 57 of shaft 12 through radial oil passage 64', annular space 63'' at the end of bushing 54, radial oil hole 63' in bushing 64 and oil groove 63 in bushing 64. The oil supply groove 63 communicates with the radially drilled passage 65 in the partition of housing 10, this passage in turn communicating with a lateral passage 66 having communication with annular groove 67' in the pump body 67 secured to the housing 10 by means of bolts 68. Into the rear end of shaft 12 is screwed a tap screw 69, through the center of which is an oil passage, this screw securing in place on the end of shaft 12 the bushing 70 which serves as a bearing for the extension shaft 71.

Keyed to the rear end of shaft 12 so as to rotate therewith is bevel gear 72 carrying a clutch part 73. This clutch part is adapted to be engaged by the clutch collar 74, which is splined upon shaft 71 so as to be slidable therealong by means of the lever 75 pivoted on shaft 76 and operable by a reversing gear shift lever, not shown, but located for access by the operator of the vehicle in the usual way. Clutch collar 74 is also engageable with clutch part 77 mounted upon bevel gear 78, this bevel gear being journalled upon shaft 71 and in a ball or other anti-friction bearing 79 secured in a cage 80 and attached to the rear end of casing 10. The packing ring 81 in the bearing cage 80 prevents the loss of oil from the mechanism and the introduction of dirt or grit. The bevel gear 78 is lubricated upon shaft 71 by oil supply through the drill of tap screw 69 to the oil passages 82. The gears 72 and 78 and the clutch mechanism are accessible through the top of the casing 10 when the cover 83 is removed.

Connecting bevel gears 72 and 78 is a third bevel gear 84, by means of which the bevel gears 72 and 78 are driven in opposite directions, so that, whereas bevel gear 72 causes shaft 71 to rotate in the same direction as shaft 12, that is, in a forward direction, when the clutch collar 71 is in engagement with clutch 73 of gear 72, the shifting of the clutch collar 74 to engage clutch 77 on gear 78 will cause shaft 71 to rotate in a direction opposite to the rotation of shaft 12, that is, in the reverse direction.

Bevel gear 84 serves as the driving medium for the oil pump and is keyed to vertical shaft 85 and held in place thereon by nut 86. The bevel gear 84 rotates on bearing block 86' set in oil pump body 67, while the shaft 85 is extended and carries the screw gear impeller 87. Accordingly, as oil flows from the sump 88 of housing 10 as it is discharged from the various oil holes of the mechanism, it is fed through passage 89 to the screw impeller 87 of the oil pump.

In operation, the flanged gear clutch 16 is rotated by the engine or other source of motive power, this clutch rotating sleeve 13 and attached drum 14, the speed of rotation and torque of these parts being governed by the engine throttle, i. e., at a certain engine speed as governed by the throttle the engine produces a corresponding torque. If the vehicle is standing and the engine is idling, for example, the rollers 31, 32, 37, and 38 follow the corresponding disc cams 45 and 46, the weights 29, 30, 35, and 36 oscillating pendulously because of the variable motion shape of the cam surfaces. Under these conditions the inertia of the stationary vehicle will maintain the cams 45 and 46 and driven shafts 12 and 71 stationary, this inertia producing a counter moment in the cam system which is greater than the turning moment of the weights, which tend to rotate the cams and driven shafts, but thus cannot do so.

Assuming now that the operator of the vehicle desires to start it in motion, he advances the throttle so that the engine develops a greater torque and speed. The consequent greater rapidity of rotation of the drum accordingly proportionately increases the centrifugal force of the weights 29, 30, 35 and 36, causing their corresponding rollers 31, 32, 37 and 38 to exert a greater pressure on their corresponding cams 45 and 46. This roller pressure upon the cams increases to the point where the turning moment of the weights exceeds the resistance of the vehicle. Under these conditions the cams are rotated by the weights and in doing so shafts 12 and 71 are rotated, the latter being driven by the former through clutch collar 74 splined upon shaft 71. The car thus begins to move, the mechanism transmitting the full torque of the engine to overcome the inertia of the vehicle in starting from rest. As the vehicle speed increases, the speed of the driven shaft will approach the speed of the driving shaft so that the ratio of the driving speed to the driven speed will automatically decrease until unity is reached. In these circumstances the rocker rollers no longer move over their respective cams, but assume a position of rest relatively to the latter, and the entire mass revolves as a unit, thus providing a direct connection between the engine and the driving wheels of the vehicle. The rollers maintain their position upon cams so long as this state of equilibrium between the driving torque and resistance torque is maintained.

The shock of the rockers in passing over the peaks of the cams, producing a reverse torque, is cushioned by the hydraulic throttling arrangement, which operates when the cams are moved backwardly by the centrifugal effect of the weights. The oil in oil grooves 49 and 50 intervenes before a positive reverse driving connection between the cams 45 and 46 with shaft 12 can be effected. As seen in Fig. 2, any counter-clockwise reverse rotation of the cam 45 causes the abutments on the cam to approach the key-like abutments 55 and 56 on the stationary shaft 12.

This relative reverse movement or backlash between the cams and shaft places the oil in grooves 49 and 50 under pressure, whereby the considerable quantity thereof in these grooves is forced through the relatively small oil slots 51 and 52 which connect them, thus producing a throttling action which retards the movement of the cams relatively to the shaft with a hydraulic cushioning and braking action. Some of the oil is forced through radial holes 53 in the cams 45 and 46 to the surfaces thereof, whereby these surfaces are lubricated. The oil which is discharged in this manner as surplusage flows through the weight apertures 43 and 44 in drum 14 and collects in the sump 88 of casing 10. Upon the return power stroke, the oil previously forced through slots 51 and 52 into the respective oil grooves 49 and 50 behind respective abutments 55 and 56, by the aforementioned reverse movement of the cams again acts as a cushion. As this oil is gradually squeezed back through oil slots 51 and 52, producing the desired effect, the shaft abutments 55 and 56 approach the corresponding cam hub abutments until they contact therewith to effect a positive driving connection between cams 45 and 46 and the shaft 12. It will be seen that inasmuch as the cams 45 and 46 are moved backwardly as the rocker arm rollers pass over the peaks thereof, the working face of the cam is lengthened whereby the power stroke of the mechanism is increased by the angle through which the cams are moved backwardly, so that there is no loss in power because of the backward movement of the cams. On the contrary, a corresponding increase of power is obtained, because the power stroke is lengthened to that extent.

The oil discharged into the sump 88 of casing 10 flows through oil passage 89 into screw pump 87 which is rotated by the connection of its driving bevel gear 84 with shaft-driven bevel gear 72. The oil is forced under pressure by the pump 87 through oil passages 65 and 66, oil groove 63 in bushing 54, oil hole 63'' in the hub of drum 14, annular oil groove 63''' in bushing 54, through the oil hole 64' in shaft 12 into the axial oil hole 57 thereof. From the axial oil hole 57 of shaft 12 the oil is supplied under pressure to throttling oil grooves 49 and 50 through radial oil holes 60 and 61 in shaft 12, also, through radial oil hole 61 to the overrunning clutch chamber 60, passage 39 to lubricate pin 22 constituting the fulcrum of rocker arm 27. In a similar way the fulcrum pins 23, 24 and 25 of rocker arms 28, 33 and 34, respectively, are lubricated, the latter two being supplied through radial oil hole 40, and groove 42 in bushing 54, which serves as the inner front bearing for drum 14. This oil under pressure in axial oil hole 57 of shaft 12 also flows through the axial oil hole of stop screw 69 and passages 82 to lubricate reversing bevel gear 78 and the corresponding bearing of shaft 71, some of this oil creeping along the shaft to lubricate the spline of clutch collar 74.

It will be seen that as the driving torque and resistance torque ratio changes from time to time, the former by means of the throttle and the latter by the road or the resistance to movement of the vehicle. If one set of rollers passes over the peaks of the corresponding cam upon the deceleration surface thereof, there is no reverse torque, but the torque is always constant, because any reverse torque is equalized by the other set of weights which are placed 90° from the first set, nor is there any shock because the oil in cam slots 49 and 50 will cushion any shock in the manner described, each cam having its own oil cushion and being independently movable by virtue thereof, since the cams are separately mounted and relatively movable with respect to each other.

When it is desired to back the vehicle, the operator simply shifts the reversing lever which actuates shaft 76 and lever 75 to shift clutch collar 74 to engage reversing bevel gear 78, whereby the propeller shaft 71 is driven in an opposite direction to shaft 12. The operation of the centrifugal mechanism is obviously the same whether the vehicle is moving forward or backward.

Accordingly, the mechanism of this invention automatically balances the driving torque against the resistance torque and vice versa, maintaining them in equilibrium at all times. Thus it is possible to control the vehicle equipped with this mechanism entirely by means of the throttle. In normal operation at high speed when a practically constant engine speed is maintained, the full torque of the engine is delivered by the mechanism to the driving wheels, and the mechanism remains stationary relatively to the cams, whereby no frictional loss or work loss takes place, and the like, and efficiency of the mechanism is increased. Inasmuch as the mechanism rotates as a unit without relative movement between the rocker arms and cams during all speed steps, the torque output thereof increases proportionately to the engine speed increase.

While a preferred embodiment of the invention has been illustrated and described herein, it is to be understood that the invention is not limited thereby, but is susceptible of changes in form and detail within its scope.

I claim:

1. In an automatic speed change mechanism, the combination of a driving member, a driven member, variable motion means positively connected to said driven member for joint movement in one direction in substantially constant angular relation, a device permitting limited relative movement between them in the opposite direction, centrifugal means connected to said driving member, and variable connections between said means controlled by the relative torques of said members, said connections constituting the driving connection between said means.

2. In an automatic speed change mechanism, the combination of a driving member, a driven member, variable motion means positively connected to said driven member for joint movement in one direction in substantially constant angular relation, a device permitting limited relative movement between them in the opposite direction, centrifugal means connected to said driving member, a follower connected to said centrifugal means and engaging said variable motion means, said follower and variable motion means being relatively movable in accordance with the torque difference between said members.

3. In an automatic speed change mechanism, the combination of a driving member, a driven member, variable motion means connected to said driven member for joint movement in one direction, centrifugal means connected to said driving member, variable connections between said means, and limited back-lash means between said variable motion means and said driven member.

4. In an automatic speed change mechanism, the combination of a driving member, a driven member, variable motion means connected to said driven member, centrifugal means connected to said driving member and to the variable motion means, and fluid shock absorbing means in the connections between said variable motion means and said driven member.

5. In an automatic speed change mechanism, the combination of a power torque member, a resistance torque member, centrifugal means driven by said power torque member, a variable motion cam positively connected to said resistance torque member only in the direction of rotation of the latter and in substantially the same angular relation therewith, and a follower for said cam controlled by said centrifugal means, said means being adapted to rotate said cam by means of said follower when the power torque exceeds the resistance torque.

6. In an automatic speed change mechanism, the combination of a power torque member, a resistance torque member, centrifugal means driven by said power torque member, a variable motion cam positively connected to said resistance torque member for joint movement in one direction, a limited back-lash device in the connections between said cam and said resistance torque member, and a follower for said cam controlled by said centrifugal means, said means being adapted to rotate said cam by means of said follower when the power torque exceeds the resistance torque.

7. In an automatic speed change mechanism, the combination of a power torque member, a resistance torque member, centrifugal means driven by said power torque member, a variable motion cam connected to said resistance torque member, a fluid shock absorbing device between said cam and said resistance torque member, and a follower for said cam controlled by said centrifugal means, said means being adapted to rotate said cam by means of said follower when the power torque exceeds the resistance torque.

8. In an automatic speed change mechanism, the combination of a power torque member, a resistance torque member, centrifugal means driven by said power torque member, a variable motion cam connected to said resistance torque member, a lost motion device between said cam and said resistance torque member permitting only reverse relative movement between them between substantially constant angular limits, a second centrifugal means driven by said power torque member and displaced angularly in its plane of movement with respect to the position of the first member in its plane of movement.

9. In an automatic speed change mechanism, the combination of a rotatable driving member, a rotatable driven member, a centrifugal means driven by said driving member, a second centrifugal means driven by said driving member and displaced angularly in its plane of rotation with respect to the position of the first means in its plane of rotation, a like variable motion cam for each of said means connected to said driven member in substantial angular alignment with respect to each other, and variable connections between said means and its corresponding cam, said means being adapted to adjust their connections with their corresponding cams in accordance with the centrifugal force developed by said means and the resistance of said driven member whereby the driven member is driven by said driving member.

10. In an automatic speed change mechanism, the combination of a rotatable driving member, a rotatable driven member, a centrifugal means driven by said driving member, a second centrifugal means driven by said driving member and displaced angularly in its plane of rotation with respect to the position of the first means in its plane of rotation, a pair of like elliptical cams connected to said driven member in substantial angular alignment with respect to each other, and movable connections between said several means and said several cams, said means being adapted to shift their connections with said cams whereby the turning moment developed by said means overcomes the resistance moment of said driven member to drive the latter.

11. In an automatic speed change mechanism for an engine, the combination of a driving member, an overrunning clutch connecting said member with said engine, a driven member, variable motion cams connected thereto, a limited back-lash device between said cams and said driven member, and centrifugal means driven by said driving member and engaging said cams, said means being adapted to rotate said cams and driven member when the turning moment developed by said means overcomes the resistance moment of said driven member.

12. In an automatic speed change mechanism for an engine, the combination of centrifugal means connected to said engine, a driven shaft, variable motion cams, lost motion connections permitting relative movement between said cams and said shaft within substantially constant angular limits, and variable driving connections between said means and said cams controlled by the difference between the turning moment of said means and the resistance moment of said driven shaft.

13. In an automatic speed change mechanism for an engine, the combination of centrifugal means driven by the engine, a driven shaft, variable motion cams variably engaged by said means so as to be driven thereby, a body of liquid between said shaft and cams forming a cushion between them, a liquid pump driven by said driven shaft, oil passages leading to said body of liquid to replenish the same, and discharge ports for said body of liquid whereby relative movement between said cams and driven shaft forces oil through these ports to produce a throttling action.

14. In an automatic speed change mechanism for an engine, the combination of a driven shaft, a pair of like elliptical cams mounted in substantial angular alignment with respect to each other upon said shaft, a pair of diametral rocker arms driven by the engine and having weights at one end and engaging one of said cams at their other ends, and a second similar pair of diametral rocker arms driven by said engine and engaging the second cam but displaced 90° axially from the first pair of rocker arms, the centrifugal forces developed by rotation of the weighted rocker arms being adapted to overcome the resistance of the driven shaft whereby the latter is driven through the connection between said cams and the rocker arms.

15. In an automatic speed change mechanism for an engine, the combination of a plurality of weighted rocker arms driven by the engine, a disc cam having acceleration and deceleration curves, variable connections between said cam and said rocker arms, and a shaft connected to said cam so as to be driven thereby in one direction only but permitting a limited backlash between said cam and shaft within substantially constant angular limits, the rocker arms being adapted to develop a centrifugal force to overcome the variable load resistance of the driven shaft whereby the latter is driven at variable speeds.

16. In an automatic speed change device, the combination of a driven member, a driven shaft, a cam journalled upon said shaft, abutments between said cam and shaft for limiting the relative movement between them in one direction but permitting relative movement between them in the opposite direction, at least two centrifugal means driven by said driving member, and variable connections between said means and said cam, whereby said means are oscillated by said cam.

17. In an automatic speed change mechanism, the combination of a driving member, a driven member, variable motion means, means interconnecting said variable motion means and driven member in substantially the same relative angular position for joint movement in one direction but permitting relative movement between them in the opposite direction, centrifugal means driven by said driving member, and connections between said variable motion means and said centrifugal means.

18. In an automatic speed change mechanism, the combination of a driving member, a driven member, variable motion means, means interconnecting said variable motion means and driven in substantially the same relative angular position for joint movement in one direction but permitting relative movement between them in the opposite direction, centrifugal means driven by said driving means and connected to said variable motion means, and means in said interconnection for retarding the said relative movement between said variable motion means and driven member.

19. In an automatic speed change mechanism, the combination of a driving member, a driven member, a variable motion means connected to said driven member, centrifugal means driven by said driving member, connections between said centrifugal means and said variable motion means whereby the latter oscillates the former, and means interconnecting said variable motion means and said driven member in substantially the same angular relation for joint movement in one direction of oscillation of said centrifugal means but permitting relative movement between them in the opposite direction of oscillation of said centrifugal means.

20. In an automatic speed change mechanism, the combination of a driving member, a driven member, a variable motion means connected to said driven member, centrifugal means driven by said driving member, connections between said centrifugal means and said variable motion means whereby the former oscillate the latter, and means connecting the variable motion means to the driven member in substantially the same angular relation whereby oscillation of the variable motion means in one direction drives the driven member, and means permitting relative movement between the variable motion means and the driven member when the variable motion means oscillates in the opposite direction.

In testimony whereof I affix my signature.

FINLEY R. PORTER.